United States Patent
Yamamoto

(10) Patent No.: US 7,750,972 B2
(45) Date of Patent: Jul. 6, 2010

(54) DIGITAL CAMERA

(75) Inventor: Yasuhiro Yamamoto, Tokyo (JP)

(73) Assignee: Hoya Corporation, Tokyo (JP)

( * ) Notice: Subject to any disclaimer, the term of this patent is extended or adjusted under 35 U.S.C. 154(b) by 405 days.

(21) Appl. No.: 11/842,401

(22) Filed: Aug. 21, 2007

(65) Prior Publication Data
US 2008/0049119 A1 Feb. 28, 2008

(30) Foreign Application Priority Data
Aug. 22, 2006 (JP) .............. P2006-225228

(51) Int. Cl.
H04N 7/14 (2006.01)
H04N 11/04 (2006.01)
(52) U.S. Cl. .............. 348/399.1; 348/405.1; 348/14.13
(58) Field of Classification Search .............. 348/399.1, 348/405.1
See application file for complete search history.

(56) References Cited

U.S. PATENT DOCUMENTS

| | | | | |
|---|---|---|---|---|
| 5,729,282 | A * | 3/1998 | Okawa | 348/14.12 |
| 2002/0039145 | A1* | 4/2002 | Kimura et al. | 348/333.11 |
| 2003/0044077 | A1* | 3/2003 | Okada | 382/239 |
| 2003/0067548 | A1* | 4/2003 | Sugimori | 348/273 |
| 2004/0264568 | A1* | 12/2004 | Florencio | 375/240.12 |
| 2006/0001929 | A1 | 1/2006 | Yamamoto | |
| 2007/0088515 | A1* | 4/2007 | Kim | 702/79 |
| 2007/0097267 | A1* | 5/2007 | Sakurai et al. | 348/571 |
| 2007/0195170 | A1 | 8/2007 | Yamamoto et al. | |

FOREIGN PATENT DOCUMENTS

| JP | 2003 274190 | 9/2003 |
|---|---|---|
| JP | 2003-274190 | * 9/2003 |

OTHER PUBLICATIONS

English language Abstract of JP 2003-274190.

* cited by examiner

*Primary Examiner*—Sinh Tran
*Assistant Examiner*—Hung H Lam
(74) *Attorney, Agent, or Firm*—Greenblum & Bernstein, P.L.C.

(57) ABSTRACT

A digital camera has a signal processor, a high-frequency detector, a sampling processor, and a compression processor. The signal processor generates luminance and color difference data on the basis of image-pixel signals read from an image sensor. The high-frequency detector detects high-frequency components in the color difference data. The sampling processor carries out a sampling process to the luminance and color difference data in accordance with a given ratio of sampling frequencies. Then, the compression processor compresses the sampled luminance and color difference data. When there is a relatively low number of high-frequency components in the color difference data, the sampling processor samples the color difference data with a low sampling frequency.

10 Claims, 5 Drawing Sheets

DIGITAL CAMERA

BACKGROUND OF THE INVENTION

1. Field of the Invention

The present invention relates to a digital camera, electronic equipment with a photographing function, such as a cellular phone, and so on. In particular, it relates to a recording process of image data.

2. Description of the Related Art

In a digital camera, image data is generally subjected to a compression process in accordance with the JPEG. Concretely, luminance data and color difference data are subjected to a sampling process, and a DCT (Discrete Cosine Transform) process and a Huffman coding process are carried out on the sampled luminance and color difference data. Consequently, compressed image data is generated. The ratio of sampling frequencies associated with the luminance and color difference data is predetermined.

In a printer system, to raise the compression factor, a sampling frequency of a low-resolution image is set to a high frequency, whereas a sampling frequency of high-resolution image is set to a low frequency. However, this compression process is not preferable to a digital camera. An effective compression process suitable for the camera is needed.

SUMMARY OF THE INVENTION

An object of the present invention is to provide a digital camera, an apparatus/method for sampling image data when compressing image data, or a computer-readable medium that is capable of effectively recording image data without decreasing image resolution.

A digital camera according to the present invention has a signal processor, a high-frequency detector, a sampling processor, and a compression processor. The signal processor generates luminance and color difference data on the basis of image-pixel signals read from an image sensor. The high-frequency detector detects high-frequency components in the color difference data. The sampling processor carries out a sampling process to the luminance and color difference data in accordance with a given ratio of sampling frequencies. Then, the compression processor compresses the sampled luminance and color difference data.

In the present invention, when there is a relatively number of high-frequency components in the color difference data, in other words, when the amount of high frequency components are less than a given amount in the image data, the sampling processor samples the color difference data with a given sampling frequency (herein, called a "low sampling frequency). The low sampling frequency is lower than a given sampling frequency that is used when there is more than a relatively low number of high-frequency components in the color difference data. Therefore, in the case of low-resolution image data in which there is a relatively number of high-frequency components, the amount of image data to be compressed decreases so that the compression factor increases without degrading image resolution.

An apparatus for sampling image data when compressing image data, according to another aspect of the present invention, has a high-frequency detector that detects high-frequency components in image data on the basis of luminance and color difference data. The apparatus also has a sampling processor that carries out a sampling process on the luminance and color difference data in accordance with a given ratio of sampling frequencies. When there is a relatively low number of high frequency components in the color difference data, the sampling processor samples the color difference data with a low sampling frequency.

A computer-readable medium that stores a program for sampling image data when compressing image data, according to another aspect of the present invention, has a high-frequency detecting code segment that detects high-frequency components in image data on the basis of luminance and color difference data. The computer-readable medium that stores the program also has a sampling process code segment that controls a sampling circuit that carries out a sampling process on the luminance and color difference data in accordance with a given ratio of sampling frequencies. When there is a relatively low number of high-frequency components in the color difference data, the sampling process code segment controls the sampling circuit so that the sampling circuit samples the color difference data with a low sampling frequency.

A method for sampling image data when compressing image data, according to another aspect of the present invention, includes a) detecting high-frequency components in image data on the basis of luminance and color difference data; b) carrying out a sampling process on the luminance and color difference data in accordance with a given ratio of sampling frequencies; and c) sampling the color difference data with a low sampling frequency when there is a relatively low number of high-frequency components in the color difference data.

BRIEF DESCRIPTION OF THE DRAWINGS

The present invention will be better understood from the description of the preferred embodiments of the invention set forth below together with the accompanying drawings, in which.

DESCRIPTION OF THE PREFERRED EMBODIMENTS

Hereinafter, the preferred embodiments of the present invention are described with reference to the attached drawings.

Figure 1:
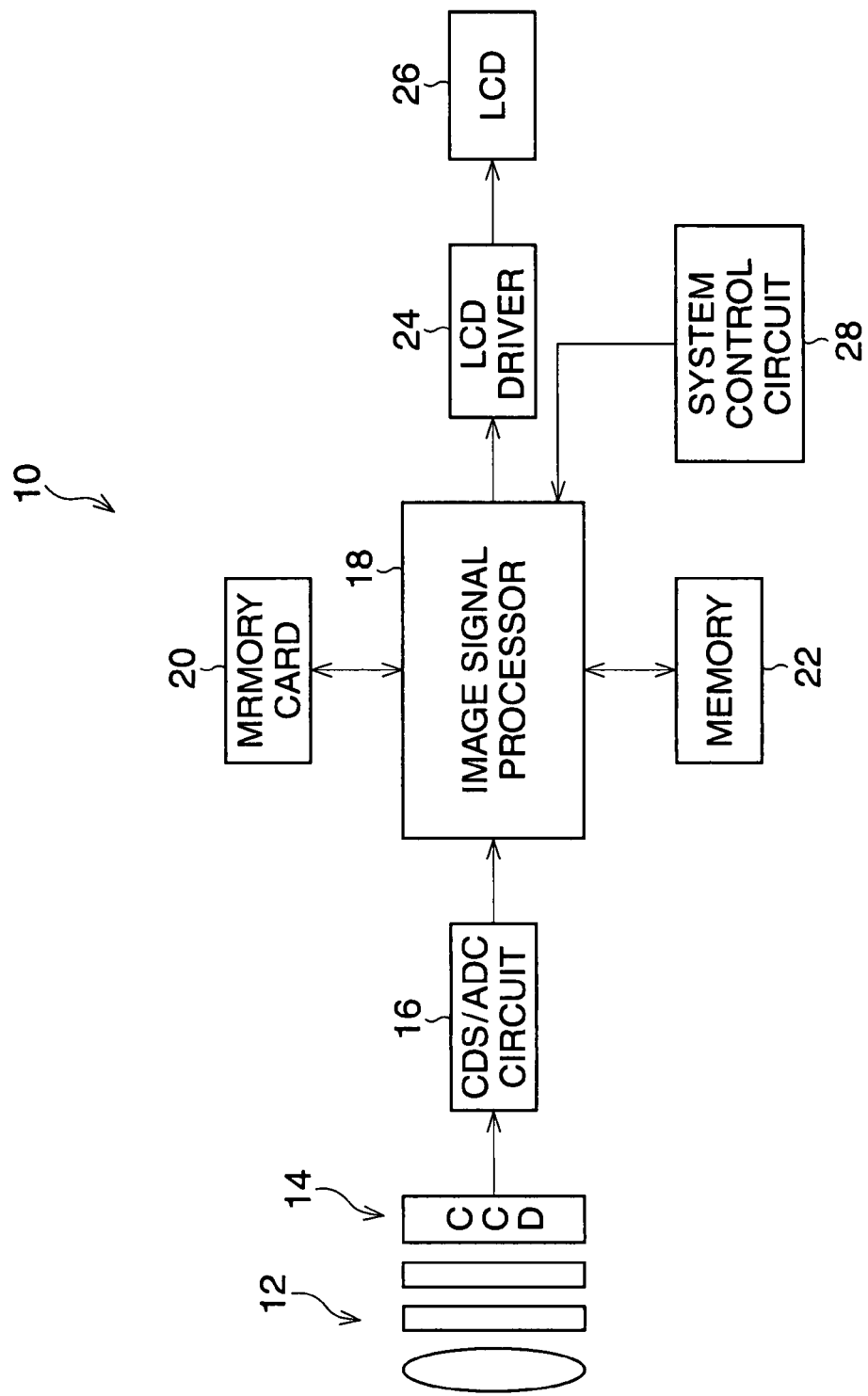
FIG. 1 is a block diagram of a digital camera according to the first embodiment.

FIG. 1 is a block diagram of a digital camera according to the first embodiment.

The digital camera 10 is turned on by depressing a power button (not shown) so that the camera 10 can carry out a photographing process. A system control circuit 28, including a CPU, ROM, and RAM, controls the action of the camera 10, and detects when a release button (not shown) is in a half-depressed or fully depressed position. In the ROM, a program for controlling the action of the camera 10 is stored.

When a normal photographing mode is selected, a signal process for displaying a moving-image on a LCD monitor 26 is performed. An object image is formed on the light-receiving surface of a CCD 14 by light passing through a photographing optical system 12, so that analog image-pixel signals corresponding to the object image are generated in the CCD 14. The generated image-pixel signals are successively read from the CCD 14 at constant intervals (for example, 1/60 seconds interval), and fed to an image signal processor 18 via a CDS/ADC circuit 16.

In the present embodiment, an on-chip color filter method using one color filter is applied. On the photo-sensor area of the CCD 14, a primary color filter, checkered by Red (R), Green (G), and Blue (B) color elements is arranged such that each area of the three color elements is opposite a pixel. Therefore, the image-pixel signals read from the CCD 14 are composed of R, G, and B color signal components.

In the image signal processor 18, various processes, such as a white balance and a gamma correction process, are performed on the digital image signals. The processed image signals are temporarily stored in a frame memory (not shown) and are fed to an LCD driver 24. The LCD driver 24 drives the LCD monitor 26 on the basis of the image signals, so that a moving image is displayed on the LCD monitor 26 provided on the back surface of the camera 10.

When the release button is depressed halfway, auto-focusing is performed and an exposure value is calculated. Further, when the release button is depressed fully, a photographing process to record a still image is carried out. Consequently, one frame's worth of image-pixel signals corresponding to a still image are read from the CCD 14, and are subjected to processing in the image signal processor 18. Then, as described later, the processed image data is compressed in the image signal processor 18, and the compressed image data is recorded in a memory card 20 that is removably installed into the camera 10.

When a playback mode is selected, the compressed image data is expanded to reconstruct the image data. The LCD driver 24 drives the LCD monitor 26 on the basis of the image data so that the recorded image is reproduced on the LCD monitor 26.

Figure 2:
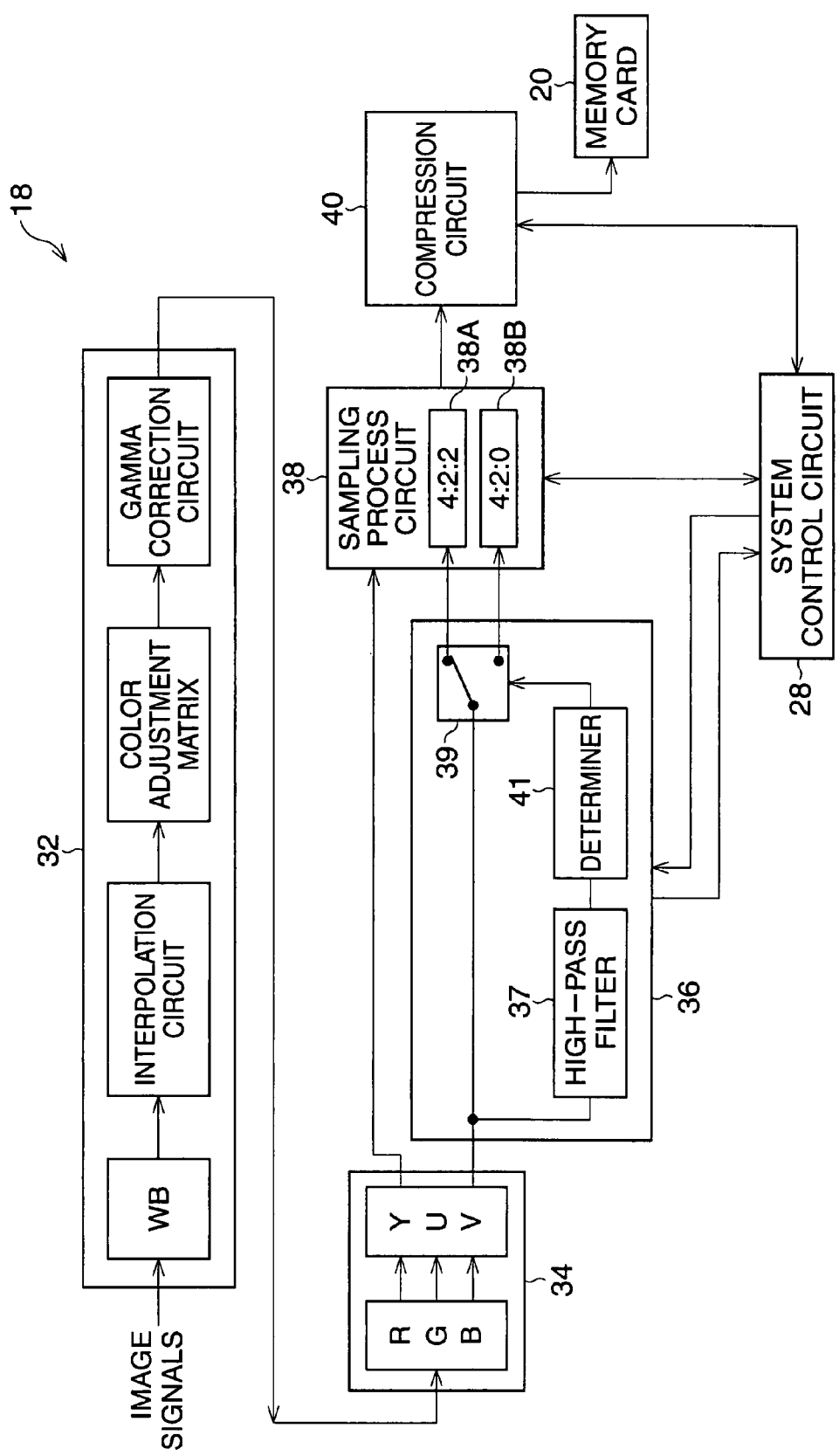
FIG. 2 is a block diagram of an image signal processor shown in FIG. 1.

FIG. 2 is a block diagram of the image signal processor 18 shown in FIG. 1.

The image signal processor 18 has a signal processing circuit 32, a matrix circuit 34, a high-frequency detecting circuit 36, a sampling process circuit 38, and a compression circuit 40. In the signal processing circuit 32, the digital R, G, and B image signals are subjected to a white balance process, gamma correction process, and so on. The processed R, G, and B image signals are input to the matrix circuit 34, in which, based on the following formulae, the R, G, B image signals are transferred to luminance and color difference signals Y, U, and V.

$$Y = 0.299R + 0.5870G + 0.1140B$$

$$U = -0.1684R - 0.3316G + 0.5000B$$

$$V = 0.5000R - 0.4187G - 0.0813B$$

The luminance signals Y are sent to a first sampling circuit 38A and a second sampling circuit 38B of the sampling process circuit 38. On the other hand, the color difference signals U and V are fed to the high-frequency detecting circuit 36.

The high-frequency detecting circuit 36 has a high-pass filter 37, a switch 39, and a determiner 41. The high-pass filter 37 samples high-frequency components in the color difference signals U and V, to detect the high frequency components in one frame's worth of image data. Generally, the high-resolution image data has many high-frequency components. The high-pass filter 37 is a Laplacian filter, in which a sum of the absolute values of the high-frequency components is obtained in accordance with the Laplacian operation. The determiner 41 determines whether the obtained sum of the absolute values exceeds a given threshold value. The threshold value is a value whether or not the proportion or percentage of the high-frequency components is relatively large. The determiner 41 outputs a control signal to the switch 39 on the basis of its determination of the determiner 41. The threshold value is predetermined as a given value in accordance with a Laplacian operation.

The switch 39 selectively outputs the color difference signals U and V to one of either the first sampling circuit 38A or the second sampling circuit 38B. When the sum of absolute values is less than the threshold value, namely, when there is a relatively low number of high-frequency components, the determiner 41 switches the switch 39 so that the luminance and color difference signals Y, U, and V are output to the second sampling circuit 38B. In the second sampling circuit 38B, the luminance and color difference signals Y, U, and V are subjected to the sampling process with a "4:2:0" ratio of sampling frequencies.

When the sum of absolute value exceeds the threshold value, namely when there is a relatively large number of high-frequency components in the image data, the determiner 41 switches the switch 39 so that the luminance and color difference signals Y, U, and V are output to the first sampling circuit 38A. In the first sampling circuit 38A, the luminance and color difference signals Y, U, and V are subjected to the sampling process with a "4:2:2" ratio of sampling frequencies.

The sampled luminance and color difference signals Y, U, and V are subjected to a compression process in the compression circuit 40. Namely, the DCT (Discrete Cosine Transform) process, the quantization process, and the Huffman coding are carried out on the luminance and color difference signals Y, U, and V.

Figure 3:
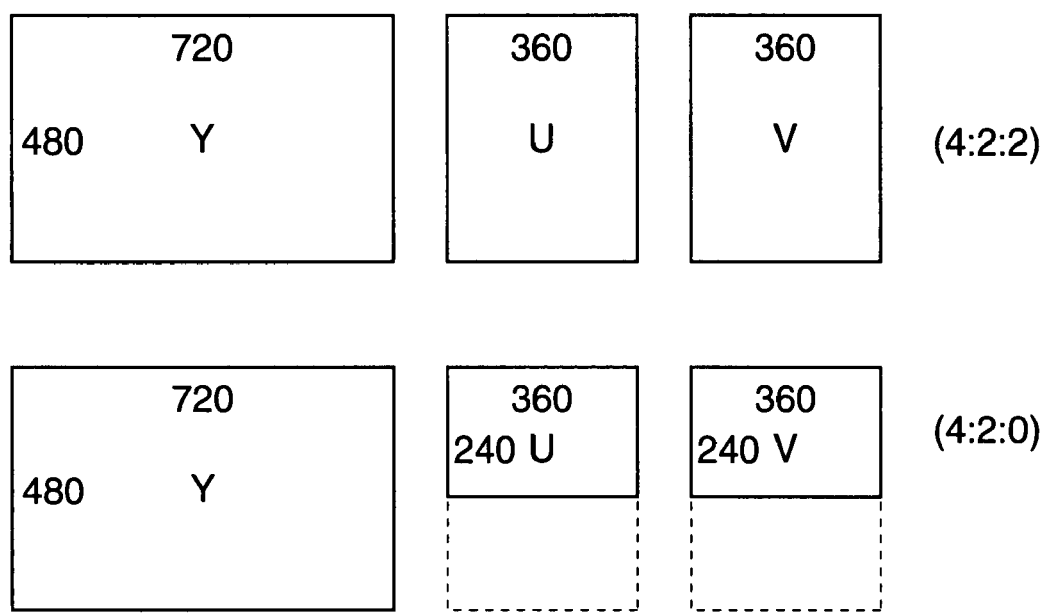
FIG. 3 is a view showing the ratios of sampling frequencies to the luminance and color difference data.

FIG. 3 is a view showing the ratios of sampling frequencies applied to the luminance and color difference data.

The sampling frequency of the color difference data U and V in the second sampling circuit 38B is relatively low compared to that in the first sampling circuit 38A. In the first sampling circuit 38A, one color difference pixel signal is sampled per two luminance pixel signals in a horizontal line. Therefore, the amount of sampled color difference data is one-half the amount of sampled luminance data with respect to the horizontal direction. On the other hand, in the second sampling circuit 38B, the amount of color difference signals U and V to be compressed is lower than the amount of the first sampling circuit 38A. In the second sampling circuit 38B, one color difference pixel signal is sampled per two luminance pixel signals in a horizontal line and a vertical line. The amount of sampled color difference data is one-quarter the amount of sampled luminance data. Therefore, the compression factor (compression ratio) of the luminance and color difference signals Y, U, and V obtained by the second sampling circuit 38B is higher than that of the luminance and color difference signals Y, U, and V obtained by the first sampling circuit 38A.

In this way, in the present embodiment, the high frequency detector 36 with the high-pass filter 37, the first sampling circuit 38A, the second sampling circuit 38B, and the determiner 41 are provided. If it is determined that there is a relatively many number of the high frequency components in the color difference data U and V, the luminance and color difference data Y, U, and V are fed to the first sampling circuit 38A where the luminance and color difference data Y, U, and V are sampled with the "4:2:2" ratio of sampling frequencies. On the other hand, if it is determined that there is a relatively low number of the high frequency components in the color difference data U and V, the luminance and color difference data Y, U, and V are fed to the second sampling circuit 38B where the luminance and color difference data Y, U, and V are sampled with the "4:2:0" ratio of sampling frequencies.

In the case where the resolution of image data is low, neighboring pixels have the same or similar pixel values. Considering that human vision is more sensitive to luminance than a hue, in the case of low-resolution image data a process that decreases the sampling rate of color difference data does not affect the resolution of the reconstructed image. Therefore, only important or necessary data components in image data should be compressed, to compress image data effectively.

Also, since circuits for compressing image data are simple (only two sampling circuit are necessary), the time required to record a still image is not influenced by the above-described compression process.

Figure 4:
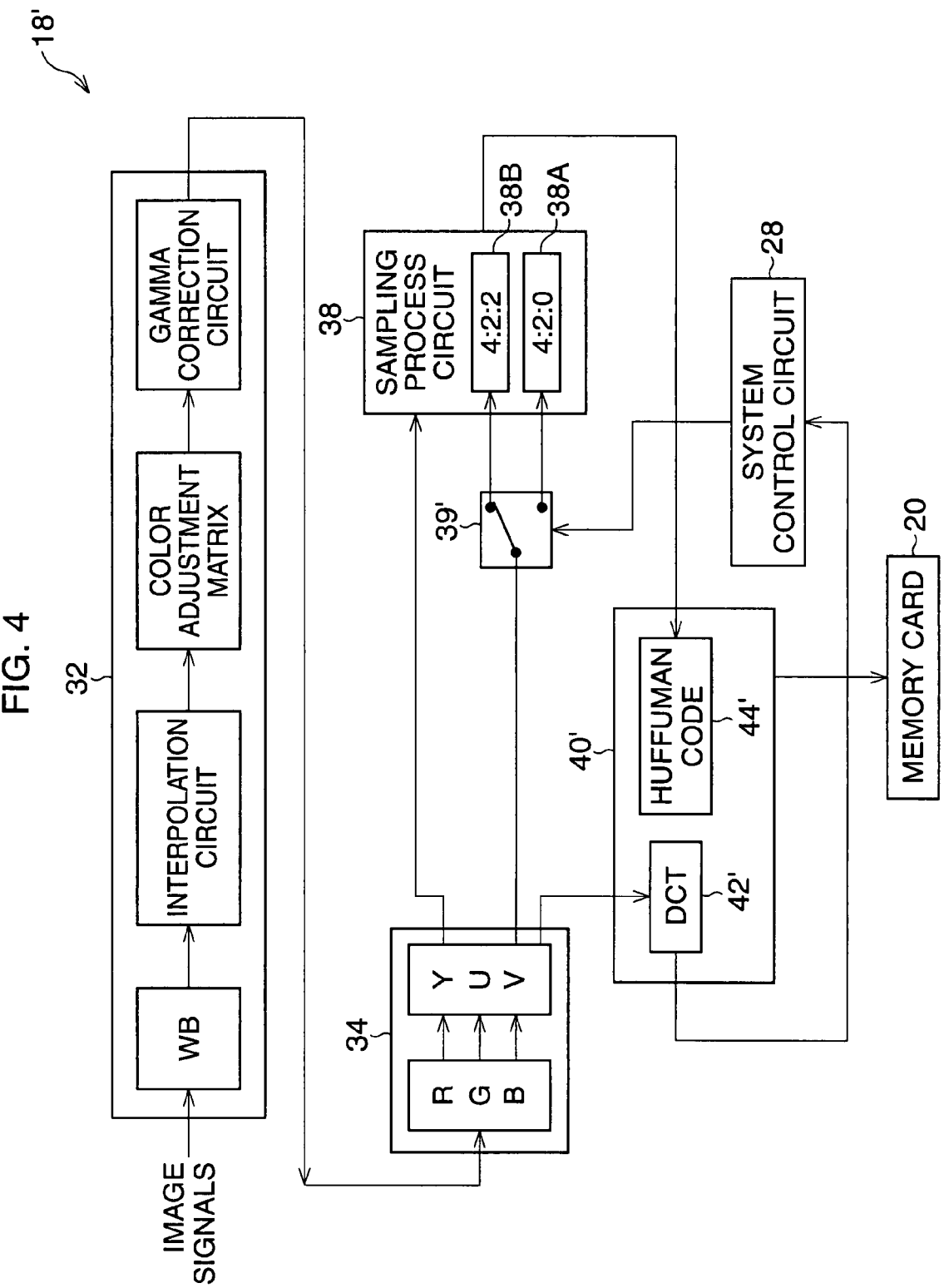
FIG. 4 is a block diagram of a digital camera according to the second embodiment.
Figure 5:
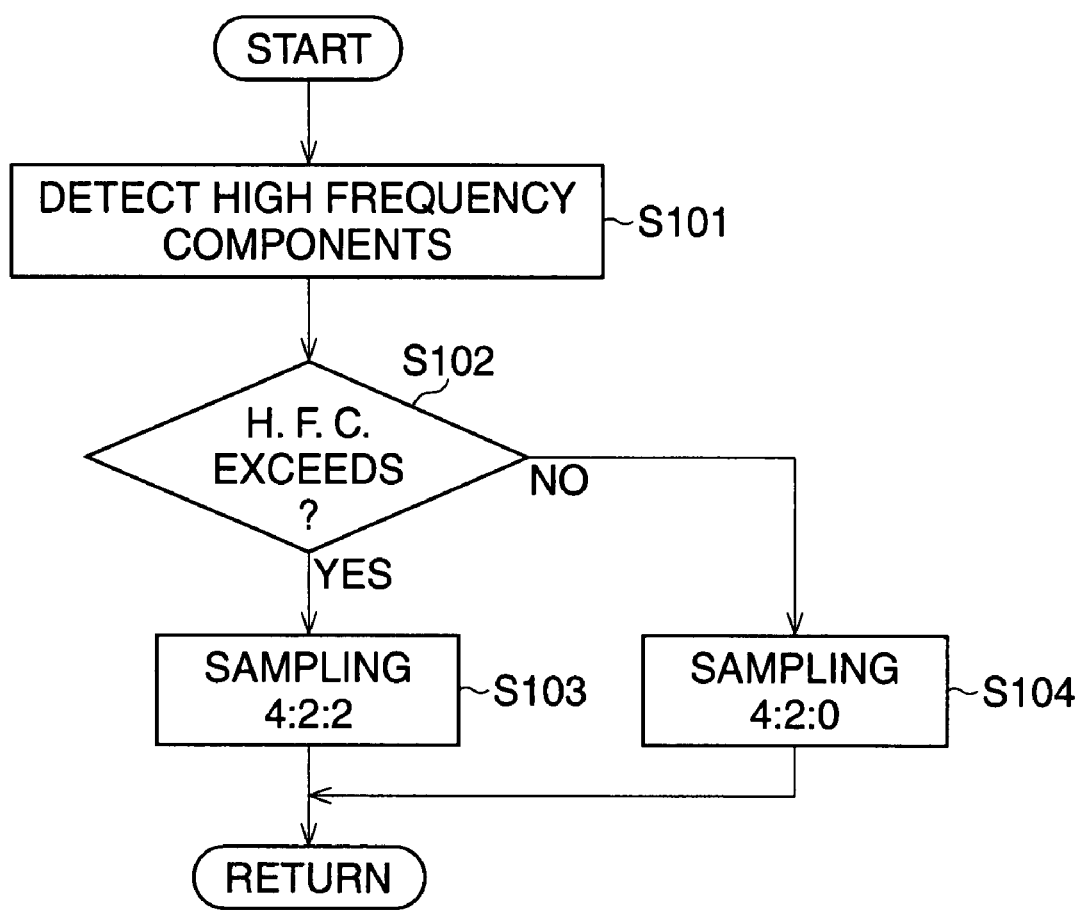
FIG. 5 is a flowchart of a sampling-frequency-setting process performed by a system control circuit.

With reference to FIGS. 4 and 5, the second embodiment is explained. The second embodiment is different from the first embodiment in that the high-frequency components are detected on the basis of DCT-processed image data. Other constructions are substantially the same as those of the first embodiment.

FIG. 4 is a block diagram of a digital camera according to the second embodiment. A compression circuit 40' has a DCT processor 42' and a Huffman processor 44'. A program for setting a ratio of sampling frequencies is stored in a ROM of the system control circuit 28.

Luminance and color difference signals Y, U, and V, which are output from the color matrix circuit 34, are input to the DCT processor 42 where the luminance and color difference signals Y, U, and V are subjected to the DCT process. Consequently, DCT-processed image data is generated. In the DCT-processed image data, high-frequency components and low-frequency components are separated.

Based upon the DCT-processed image data, the system control circuit 28 determines whether the sum of absolute values of the high-frequency components exceeds a given value. Then, the system control circuit 28 controls a switch 39' such that the color difference signals U and V, which is output from the color matrix 34, are fed to the first sampling circuit 38A or the second sampling circuit 38B. The sampled luminance and color difference signals Y, U, and V are then subjected to the DCT process and the Huffman coding.

FIG. 5 is a flowchart of a sampling-frequency-setting process performed by the system control circuit 28.

In Step S101, high-frequency components in the DCT-processed luminance and color difference signals Y, U, and V are detected. In Step S102, it is determined whether the sum of the absolute values of the high-frequency components exceeds a given value. If it is determined that the sum of the absolute values of the high-frequency components exceeds the given value, the process goes to Step S103. In Step S103, the switch 39' is controlled so that the color difference signals U and V are fed from the matrix circuit 34 to the first sampling circuit 38A.

On the other hand, when it is determined that the sum of the absolute values of the high-frequency components does not exceed the given value, the process proceeds to Step S104. In Step S104, the switch 39' is controlled so that the color difference signals U and V are fed from the matrix circuit 34 to the second sampling circuit 38B.

As for the ratio of sampling frequencies, another ratio of sampling frequencies that is different from the ratio described above may be applied. For example, the "4:4:4" ratio of sampling frequencies may be applied to the first sampling circuit 38A, whereas the "4:1:1" ratio of sampling frequen-cies may be applied to the second sampling circuit 38B. Further, only the sampling frequency of color difference data U and V may be changed.

Another manner of compression processing may be optionally applied. Also, another method of detecting high-frequency components in color difference data U and V may be applied instead of the Laplacian operation or the DCT process.

A video-camera or electric equipment with a photographing function, such as a cellular phone, may be applied instead of the digital camera. Further, the above compression process may be applied to a computer network such as the Internet, using a computer system.

Finally, it will be understood by those skilled in the arts that the foregoing description is of preferred embodiments of the device, and that various changes and modifications may be made to the present invention without departing from the spirit and scope thereof.

The present disclosure relates to subject matter contained in Japanese Patent Application No. 2006-225228 (filed on Aug. 22, 2006), which is expressly incorporated herein by reference, in its entirety.

The invention claimed is:

1. A digital camera comprising:
    a signal processor that generates luminance and color difference data on the basis of image-pixel signals read from an image sensor;
    a high-frequency detector that detects high-frequency components in the color difference data;
    a sampling processor that carries out a sampling process on the luminance and color difference data in accordance with a given ratio of sampling frequencies; and
    a compression processor that compresses the sampled luminance and color difference data;
    wherein said sampling processor samples the color difference data with a low sampling frequency when the color difference data includes a relatively low number of high-frequency components, the low sampling frequency being less than a given sampling frequency that is used when high-frequency components more than the relatively low number are included in the color difference data.

2. The digital camera of claim 1, wherein said sampling processor sets the ratio of sampling frequencies to "4:2:0" when there is a relatively low number of high-frequency components in the color difference data.

3. The digital camera of claim 1, wherein said sampling processor sets the ratio of sampling frequencies to "4:2:2" when the there is more than a relatively low number of high-frequency components in the color difference data.

4. The digital camera of claim 1, wherein said high-frequency detector detects the high-frequency components by applying a Laplacian operation to the color difference data.

5. The digital camera of claim 1, wherein said high-frequency detector detects the high-frequency components on the basis of DCT-processed color difference data.

6. The digital camera of claim 1, wherein said compression processor carries out a DCT process and a Huffman coding on the luminance and color difference data.

7. The digital camera of claim 1, further comprising a determiner that determines whether a sum of absolute values of detected high-frequency components is less than a given value.

8. An apparatus for sampling image data when compressing image data, comprising:

a high-frequency detector that detects high-frequency components in image data on the basis of luminance and color difference data; and a sampling processor that carries out a sampling process on the luminance and color difference data in accordance with a given ratio of sampling frequencies, wherein said sampling processor samples the color difference data with a low sampling frequency when the color difference data includes a relatively low number of high frequency components, the low sampling frequency being less than a given sampling frequency that is used when high-frequency components more than the relatively low number are included in the color difference data.

9. A non-transitory computer-readable medium that stores a program for sampling image data when compressing image data, comprising:

a high-frequency detecting code segment that detects high-frequency components in image data on the basis of luminance and color difference data; and a sampling process segment code that controls a sampling circuit that carries out a sampling process on the luminance and color difference data in accordance with a given ratio of sampling frequencies, wherein said sampling process code segment controls the sampling circuit such that said sampling circuit samples the color difference data with a low sampling frequency when the color difference data includes a relatively low number of high-frequency components, the low sampling frequency being less than a given sampling frequency that is used when high-frequency components more than the relatively low number are included in the color difference data.

10. A method for sampling image data when compressing image data, comprising:

detecting high frequency components in image data on the basis of luminance and color difference data;

carrying out a sampling process on the luminance and color difference data in accordance with a given ratio of sampling frequencies; and sampling the color difference data with a low sampling frequency when the color difference data includes a relatively low number of high frequency components, the low sampling frequency being less than a given sampling frequency that is used when high frequency components more than the relatively low number are included in the color difference data.

\* \* \* \* \*